(12) United States Patent
Busnardo et al.

(10) Patent No.: US 6,708,394 B2
(45) Date of Patent: Mar. 23, 2004

(54) BASKET ASSEMBLY FIXTURE

(75) Inventors: Rick Busnardo, Oceanside, CA (US); Robert Hill, Oceanside, CA (US)

(73) Assignee: Southern California Edison Co., Inc., Rosemead, CA (US)

( * ) Notice: Subject to any disclaimer, the term of this patent is extended or adjusted under 35 U.S.C. 154(b) by 152 days.

(21) Appl. No.: 10/060,531

(22) Filed: Jan. 30, 2002

(65) Prior Publication Data

US 2003/0140471 A1 Jul. 31, 2003

(51) Int. Cl.[7] .................... B23Q 17/00; B23P 19/00
(52) U.S. Cl. .................... 29/723; 29/468; 29/281.4; 29/281.5; 29/559; 29/407.1; 269/19; 376/272
(58) Field of Search .................... 29/723, 281.4, 29/281.5, 407.09, 407.1, 464, 468, 559; 269/19, 20, 307; 254/11, 93 R; 376/272

(56) References Cited

U.S. PATENT DOCUMENTS

| | | | | | |
|---|---|---|---|---|---|
| 4,139,778 A | * | 2/1979 | Raymond | .................... | 376/272 |
| 4,295,257 A | * | 10/1981 | Strohs | ........................ | 29/281.5 |
| 4,723,359 A | * | 2/1988 | Blissell et al. | ................ | 29/723 |
| 4,930,650 A | * | 6/1990 | Wells | ......................... | 376/272 |
| 5,044,846 A | * | 9/1991 | Richardson | .................. | 376/272 |
| 5,251,243 A | * | 10/1993 | Nylund et al. | ................ | 29/723 |
| 5,550,882 A | * | 8/1996 | Lehnert et al. | .............. | 376/272 |
| 5,615,240 A | * | 3/1997 | Wolters et al. | .............. | 376/272 |
| 5,655,281 A | * | 8/1997 | Nagata et al. | ............. | 29/281.5 |
| 6,298,536 B1 | * | 10/2001 | Rossway et al. | ........... | 29/281.4 |
| 6,615,478 B2 | * | 9/2003 | Walker et al. | ............. | 29/281.4 |
| 2002/0042981 A1 | * | 4/2002 | Barnum et al. | ................ | 29/464 |

* cited by examiner

Primary Examiner—David P. Bryant

(57) ABSTRACT

A basket assembly fixture is useful in the construction of a basket assembly for interring spent nuclear fuel rods. The basket assembly fixture has an elongate base and a pair of lifting beams disposed above the base. Lifting beam raising means are provided at both ends of the base to raise the pair of lifting beams. A transverse beam is provided below the two lifting beams and above the base. Transverse beam raising means are provided for raising the transverse beam.

7 Claims, 4 Drawing Sheets

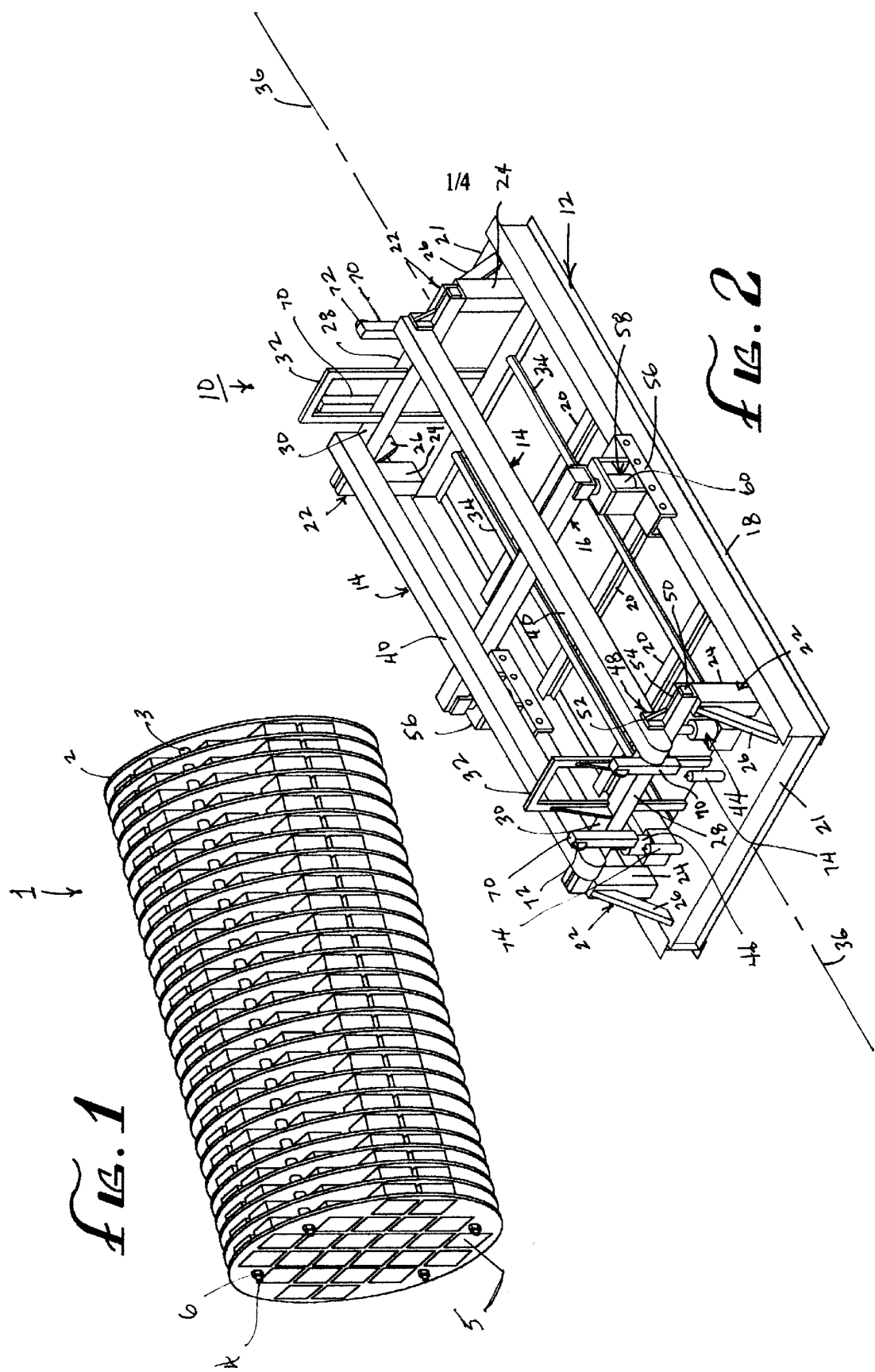

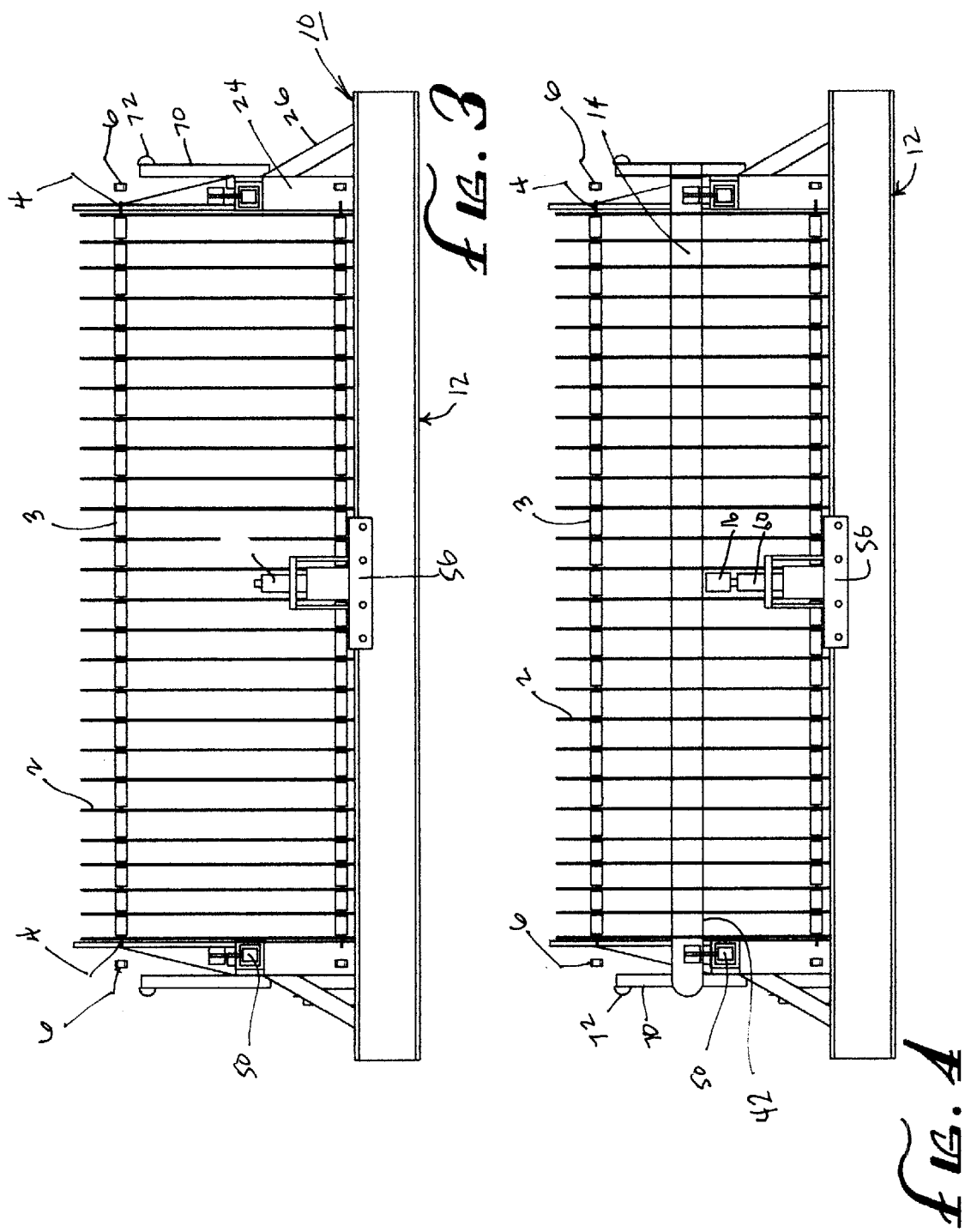

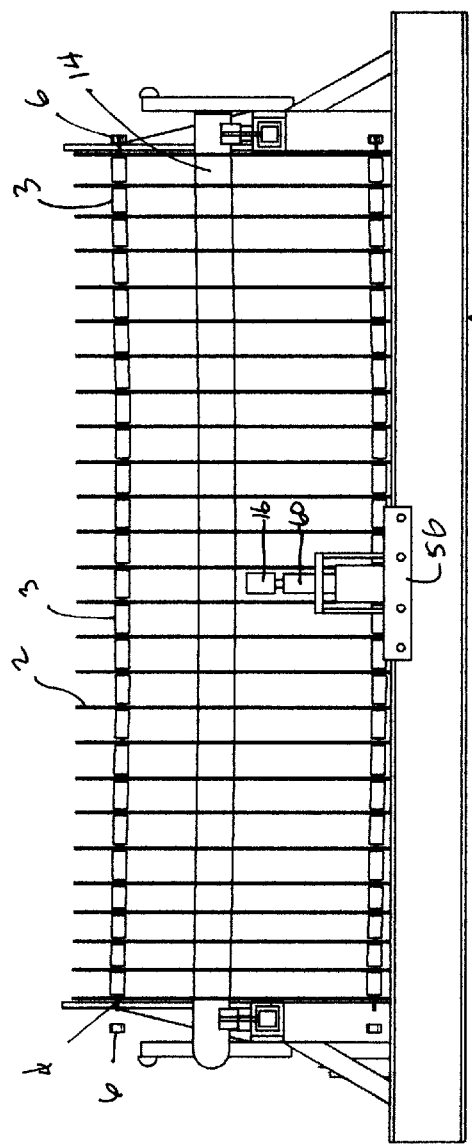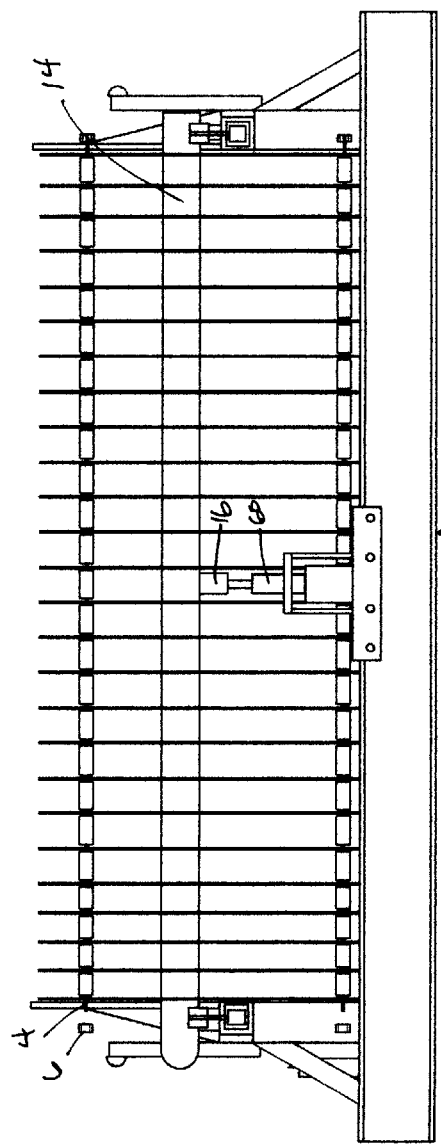

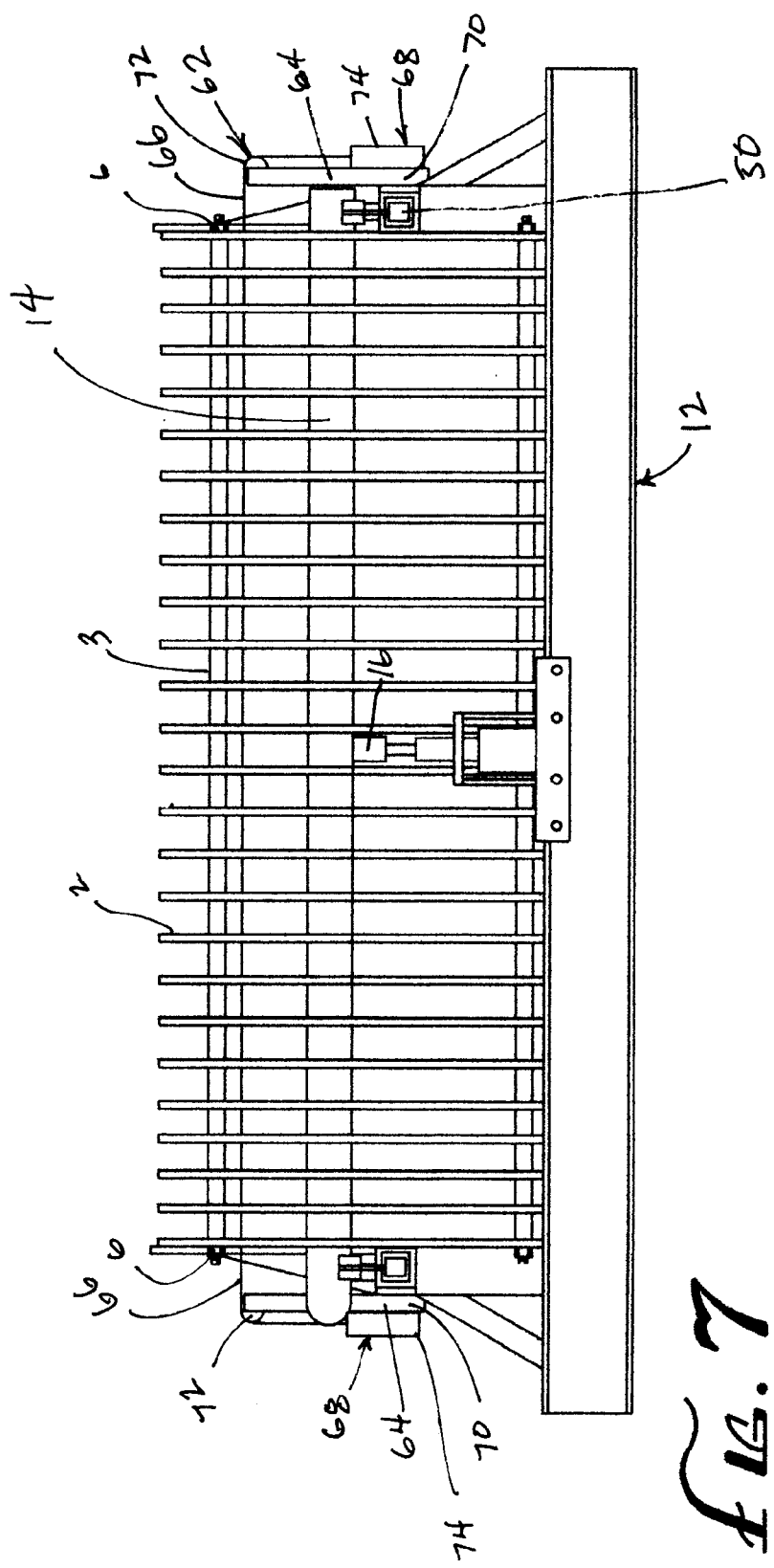

BASKET ASSEMBLY FIXTURE

FIELD OF THE INVENTION

This invention relates generally to the transportation and internment of spent nuclear fuel rods and, more specifically, to the assembly of fixtures used in the transportation and internment of spent nuclear fuel rods.

BACKGROUND OF THE INVENTION

The safe transportation and/or internment of spent nuclear fuel rods is a highly complex task. The spent fuel rods must be rigidly retained within a structure which virtually guarantees proper spacing between the rods. Also, the structure must be extremely rugged and not apt to lose its structural integrity even in a massive traumatic occurrence, such as in a train derailment.

One such structure is illustrated in FIG. 1 and will hereinafter be referred to as a basket assembly. The basket assembly comprises a large plurality of metal disks, spaced apart by spacers and held rigidly together by parallel support rods. Defined within each of the steel plates are square apertures having dimensions which meet rigid tolerances. Each square aperture in each steel plate is carefully aligned with a square aperture in each of the other steel plates so as to form an elongate, square cross-sectioned tubular opening within the basket assembly. Thus, the basket assembly has a plurality of such elongate tubular openings. Spent fuel rods are disposed within elongate tubes having a square external cross section. The elongate tubes are manufactured to precise tolerances to perfectly fit within each elongate tubular opening within the basket assembly. As illustrated in FIG. 1, the basket assembly is capable of holding a plurality of the elongate tubes, each disposed parallel to the longitudinal axis of the basket assembly.

The basket assembly illustrated in FIG. 1 meets the rigid structural integrity requirements set by the industry and the federal government. However, the basket assembly is difficult, time-consuming and tedious to assemble. Because the tolerances between the square apertures and the elongate tubes are extremely tight, the square apertures must be aligned with considerable precision. Assembling the plurality of steel plates on the parallel support rods with such precision is extremely difficult.

Traditionally, the basket assembly is assembled vertically. The rearmost steel plate is disposed in the horizontal, threaded onto each of the parallel support rods. Spacers are placed on each of the parallel support rods and then a second steel plate is placed over the parallel support rods. The square apertures in the second plate are precisely aligned with the square apertures in the first plate. In similar fashion, each of the steel plates is assembled onto the parallel support rods, each steel plate being spaced apart from the next lower steel plate by spacers. Slowly and tediously, the basket assembly is assembled upwardly. As the basket assembly grows taller, scaffolding must be assembled around a basket assembly to allow workers to locate each new steel plate onto the parallel support rods.

During the assembly operation, maintaining the square apertures in the steel plates in near perfect alignment is extremely difficult. It is frequently necessary to disassemble a partially assembled basket assembly and begin the process of assembling the basket assembly anew.

Accordingly, there is a need for a method for assembling basket assemblies which avoids these aforementioned problems with the prior art.

DRAWINGS

These features, aspects and advantages of the present invention will become better understood with regard to the following description, appended claims and accompanying figures where:

FIG. 1 is an isometric view of a basket assembly which is the subject of the present invention;

FIG. 2 is an isometric view of a basket assembly fixture having features of the invention;

FIG. 3 is a side view of the basket assembly fixture illustrated in FIG. 2, showing support disks disposed in place upon the fixture;

FIG. 4 is a diagrammatic side view of the basket assembly fixture illustrated in FIG. 3 showing one step in the assembly of a basket fixture;

FIG. 5 is a diagrammatic side view of the basket assembly fixture illustrated in FIG. 3 showing another step in the assembly of a basket fixture;

FIG. 6 is a diagrammatic side view of the basket assembly fixture illustrated in FIG. 3 showing another step in the assembly of a basket fixture; and FIG. 7 is a diagrammatic side view of the basket assembly fixture illustrated in FIG. 3 showing another step in the assembly of a basket fixture.

DETAILED DESCRIPTION

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a basket assembly fixture 10 useful in the construction of a basket assembly 1 for interring spent nuclear fuel rods. As noted in the Background Section, such a basket assembly 1 is illustrated in FIG. 1. The basket assembly 1 comprises a plurality of spaced apart steel support disks 2 assembled in parallel in spaced apart fashion by spacers 3 and held together by parallel support rods 4. The basket assembly defines a plurality of elongate tubular openings having square cross-sections. Each elongate tubular opening is capable of accepting and retaining an elongated tube 5 having a square cross-section.

In the invention, the basket assembly fixture 10 comprises an elongate base 12, a pair of lifting beams 14 disposed above the base 12 and a transverse beam 16 disposed above the base 12 but below the lifting beams 14.

As illustrated in FIG. 2, the base 12 can have a rectangular shaped perimeter 18. The rectangular perimeter 18 can be reenforced by a plurality of spaced apart frame transverse beams 20.

Disposed at each of the two ends 21 of the base 12 are end stanchions 22. Each end stanchion 22 comprises a pair of vertical stanchion support posts 24. Each of the stanchion support posts 24 can be reenforced by a stanchion angular member 26. A horizontal stanchion beam 28 is disposed between the stanchion support posts 24. In the embodiment illustrated in the drawings, the horizontal stanchion beam 28 is a hollow box beam having a flat horizontal upper surface 30.

Also disposed at each end 21 of the base 12 are a pair of vertical plate support structures 32.

The base 12 further comprises a pair of longitudinal plate support rails 34 disposed in parallel to the longitudinal axis 36 of the base 12.

The entirety of the base 12 is made from heavy duty materials, such as from steel beams.

The pair of lifting beams 14 are disposed parallel to the longitudinal axis 36 of the base 12. Each of the pair of lifting beams 14 is supported at its respective opposite ends by the pair of horizontal stanchion beams 28. The pair of lifting beams 14 are typically steel box beams having flat horizontal upper surfaces 40 and lower surfaces 42 (see FIG. 4).

The basket assembly fixture 10 further comprises an elevator 44 for alternatively raising and lowering both ends of each lifting beam 14. In the embodiment illustrated in the drawings, the elevator 44 comprises hydraulic jacks 46, one disposed beneath each end of each lifting beam 14. Each jack 46 operates via holes (not shown) drilled within one of the horizontal stanchion beams 28. In one embodiment, each jack 46 operates against a slidable pin (not shown) which is vertically disposed within one of the holes in one of the horizontal stanchion beams 28.

The basket assembly fixture 10 further comprises a lifting beam lateral shifter 48 for laterally shifting both ends of each lifting beam 14. In the embodiment illustrated in the drawings, the lifting beam lateral shifter 48 comprises horizontally disposed hydraulic jacks 50 disposed within each of the ends of each of the horizontal stanchion beams 28. In the embodiment illustrated in the drawings, the horizontally disposed jacks 50 operate against push plates 52 which slide within slots 54 disposed within the upper surface 30 of the horizontal stanchion beam 28.

The transverse beam 16 is disposed generally horizontally above the frame 12 and directly below, and generally perpendicular to, the two lifting beams 14. The transverse beam 16 has opposed ends, each of which is supported on a transverse beam support structure 56 which can be attached to one of the sides of the perimeter 18 of the base 12.

The basket assembly fixture 10 further comprises transverse beam elevator 58 for alternatively raising and lowering both ends of the transverse beam 16. In the embodiment illustrated in the drawings, the transverse beam elevator 58 comprises a pair of vertically disposed hydraulic jacks 60.

Typically, the basket assembly fixture 10 further comprises an aligner 62 for aligning the horizontal and vertical disposition of both of the pairs of lifting beams 14 (see FIG. 7). In the embodiment illustrated in the drawings, the aligner 62 comprises a pair of tight wire assemblies 64. Each tight wire assembly 64 comprises (i) a length of wire 66 disposed above the base 12 and parallel to the longitudinal axis 36 of the base 12, and (ii) tightening means for drawing the length of wire 66 taut. In the embodiment illustrated in the drawings, each tight wire assembly 64 comprises a length of wire 66 drawn taut between a pair of opposed vertical tight wire support posts 70. Each vertical tight wire support post 70 comprises a rotatable sheave 72 to minimize damage to each length of wire 66. The tightening means 68 are provided by a pair of weights 74, each disposed at one end of each length of wire 66. Each such weight 74 is capable of drawing each length of wire 66 taut such that each length of wire 66 is nearly perfectly linear. In a typical embodiment, each length of wire 66 is made from a length of 0.035 inches steel wire and the weight of each weight 74 is about 30 pounds. The height and the placement of the vertical tight wire support posts 70 are carefully determined so that a length of wire 66 drawn between opposing sheaves 72 is nearly perfectly horizontal and nearly perfectly parallel to the longitudinal axis 36 of the base 12.

The method of assembling a basket assembly 1, such as illustrated in FIG. 1 using the basket assembly fixture illustrated in FIG. 2, is best seen with regard to FIGS. 3–7. FIG. 3 illustrates the initial steps of the method wherein the pair of lifting beams 14 are removed from the basket assembly fixture 10 and the plurality of basket assembly support disks 2 are disposed vertically, spaced apart from one another, onto the pair of longitudinal plate support rails 34. The first of the basket assembly support disks 2 is disposed in abutment or in near abutment to one of the two vertical plate support structures 32, while the last of the basket assembly support disks 2 is disposed in abutment or in near abutment with the other of the vertical plate support structures 32.

Once the plurality of basket assembly support disks 2 are disposed on the longitudinal plate support rails 34, each of the support rods 4 is threaded through appropriate support rod apertures in each basket assembly support disk 2. As the threading of the support rods 4 is accomplished, appropriate spacers 3 are disposed along the support rods 4 in between each pair of adjoining basket assembly support disks 2. As illustrated in FIG. 3, the nuts 6 at the ends of the support rods 4 are not tightened down at this point in the method.

After the plurality of basket assembly support disks 2 is arranged as illustrated in FIG. 3, the pair of lifting beams 14 are threaded through appropriate lifting beam apertures 76 in each of the support disks 2 as illustrated in FIG. 4. The upper edge of each of the lifting beam apertures 76 in each of the basket assembly support disks 2 is horizontal.

After the lifting beams 14 are installed as illustrated in FIG. 4, the lifting beams 14 are raised by the lifting beam elevator 44 as illustrated in FIG. 5. The lifting beams 14 are raised sufficiently to raise each of the basket assembly support disks 2 above the base 12 of the basket assembly fixture 10. Because of the excessive weight of the basket assembly support disks 2, both lifting beams 14 tend to sag slightly at their centers.

The next step is illustrated in FIG. 6 wherein the sag in each of the lifting beams 14 is taken out by raising the transverse beam 16 using the transverse beam elevator 58.

Next, each of the support disks 2 is vertically aligned using the alignment measuring means, the lifting beam elevator 44 and the transverse beam elevator 58. In embodiments wherein the vertical alignment measuring means 62 comprises a pair of tight wire assemblies 64, the vertical alignment of each of the support disks 2 is compared to the horizontally disposed length of wire 66 (see FIG. 7). To the extent that vertical adjustment is required, such adjustment can be accomplished by raising or lowering the lifting beam elevator 44 and/or the transverse beam elevator 58.

Similarly, the lateral alignment of the plurality of support disks 2 is accomplished using the aligner 62 and the lifting beam lateral shifter 48. Where the aligner 62 is provided by a tight wire assembly 64, the lateral alignment of each support disk 2 is aligned with the length of wire 66 (again, see FIG. 7). To the extent that adjustment is necessary, such adjustment can be accomplished using the lifting beam lateral shifter 48 to shift the lifting beams 14 either to one side or to the other.

Once the plurality of support disks 2 are perfectly aligned vertically and laterally, the support disks 2 are rigidly attached to one another. In the embodiment illustrated in the drawings, this is accomplished by tightening down the nuts 6 on the ends of each of the support rods 4. Once this is accomplished, the basket assembly 1 is both rigid and perfectly aligned, ready to accept a plurality of elongate tubes 5 containing spent nuclear fuel rods (as illustrated in FIG. 1).

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A basket assembly fixture useful in the construction of a basket assembly for interring spent nuclear fuel rods, the basket assembly fixture comprising:
    (a) an elongate base having a first end, an opposed second end and a longitudinal axis;
    (b) a pair of lifting beams disposed above the base and generally parallel to the longitudinal axis of the base, each lifting beam having a first end and an opposed second end;
    (c) a lifting beam elevator for alternatively raising and lowering both ends of each lifting beam;
    (d) a lifting beam lateral shifter for laterally shifting both ends of each lifting beam;
    (e) a transverse beam disposed generally horizontally above the frame, the transverse beam also being disposed below and generally perpendicular to the two lifting beams, the transverse beam having a first end and an opposed second end; and
    (f) a transverse beam elevator for alternatively raising and lowering both ends of the transverse beam.

2. The basket assembly fixture of claim 1 further comprising an aligner for aligning the horizontal and vertical disposition of both of the pair of lifting beams.

3. The basket assembly fixture of claim 2 wherein the aligner comprises a pair of tight wire assemblies, each tight wire assembly comprising (i) a length of wire disposed above the base and generally parallel to the longitudinal axis of the base and (ii) a tightener for drawing the length of wire taut.

4. The basket assembly fixture of claim 3 wherein the tightener comprises at least one weight disposed at the end of the length of wire.

5. The basket assembly fixture of claim 1 wherein the lifting beam elevator, the lifting beam lateral shifter and the transverse beam elevator are each hydraulic jacks.

6. The basket assembly fixture of claim 1 further comprising a plurality of basket assembly support disks supported on the frame and disposed in vertical planes and in parallel with one another, each basket assembly support disk comprising at least two support beam apertures therethrough, each of the two lifting beams being disposed through support beam apertures.

7. The basket assembly fixture of claim 6 wherein the plurality of basket assembly support disks are fastened to one another by a plurality of generally parallel support rods.

* * * * *